United States Patent
Frens

(10) Patent No.: US 8,544,861 B2
(45) Date of Patent: Oct. 1, 2013

(54) ADJUSTMENT BOLT FOR ADJUSTING CAMBER ANGLE

(75) Inventor: James Roger Frens, Estes Park, CO (US)

(73) Assignee: Niwot Corporation, Longmont, CO (US)

( * ) Notice: Subject to any disclaimer, the term of this patent is extended or adjusted under 35 U.S.C. 154(b) by 0 days.

(21) Appl. No.: 13/452,803

(22) Filed: Apr. 20, 2012

(65) Prior Publication Data

US 2012/0269596 A1 Oct. 25, 2012

Related U.S. Application Data

(63) Continuation-in-part of application No. 13/035,344, filed on Feb. 25, 2011.

(51) Int. Cl.
*B62D 17/00* (2006.01)

(52) U.S. Cl.
USPC .................. 280/86.753; 280/86.754; 411/398

(58) Field of Classification Search
USPC ............... 280/86.753, 86.751, 86.75, 86.754; 411/398, 366.1; 403/408.1; 16/239, 240, 16/241, 242, 243, 244, 245, 246
See application file for complete search history.

(56) References Cited

U.S. PATENT DOCUMENTS

| | | | |
|---|---|---|---|
| 4,313,617 A * | 2/1982 | Muramatsu et al. | ..... 280/86.753 |
| 4,616,845 A | 10/1986 | Pettibone | |
| 4,619,465 A | 10/1986 | Johnson | |
| 4,695,073 A | 9/1987 | Pettibone et al. | |
| 4,706,987 A | 11/1987 | Pettibone et al. | |
| 4,863,187 A | 9/1989 | Artz | |
| RE33,179 E | 3/1990 | Pettibone | |
| 4,982,977 A * | 1/1991 | Shimada | ............ 280/86.753 |
| 5,007,658 A | 4/1991 | Blechschmidt | |
| 5,080,388 A | 1/1992 | Berry et al. | |
| 5,104,141 A * | 4/1992 | Grove et al. | ............ 280/86.753 |
| 5,110,151 A | 5/1992 | Blechschmidt et al. | |
| 5,129,669 A * | 7/1992 | Specktor et al. | ......... 280/86.753 |
| 5,163,699 A * | 11/1992 | Specktor | ................. 280/86.753 |
| 5,301,977 A | 4/1994 | Schlosser et al. | |
| 5,622,378 A | 4/1997 | Schlosser et al. | |
| 5,779,260 A * | 7/1998 | Reilly et al. | ............ 280/86.754 |
| 5,836,597 A | 11/1998 | Schlosser et al. | |
| 6,036,205 A | 3/2000 | Schlosser et al. | |
| 6,302,416 B1 * | 10/2001 | Schmack | ................. 280/93.512 |
| 2006/0088398 A1 | 4/2006 | Lund | |

FOREIGN PATENT DOCUMENTS

| | | |
|---|---|---|
| CA | 2047580 | 8/1992 |
| CA | 2161637 | 11/1994 |
| DE | 3714689 A1 * | 11/1988 |
| EP | 0255921 | 2/1988 |
| JP | 3161088 U * | 7/2010 |
| KR | 2010070459 A * | 2/2011 |
| WO | WO94/25326 | 11/1994 |

* cited by examiner

*Primary Examiner* — Keith Frisby
(74) *Attorney, Agent, or Firm* — Dorsey & Whitney LLP

(57) ABSTRACT

An adjustment bolt for adjusting the camber angle in a vehicle. The adjustment bolt includes a head, a neck, a lobe, and a threaded portion. The head is configured to provide a gripping surface for a tightening tool (e.g., pliers, wrench). The neck extends eccentrically from the bottom surface of the head and the neck has a first diameter and a first centerline. The lobe extends eccentrically outward from a bottom surface of the neck and the lobe has a second diameter and a second centerline. The threaded portion extends eccentrically outward from a bottom surface of the lobe and has a third centerline. The first centerline, the second centerline, and the third centerline are different from one another. Additionally, the lobe diameter is substantially the same as an aperture diameter for an adjustment aperture in a knuckle operably connected to the vehicle.

14 Claims, 19 Drawing Sheets

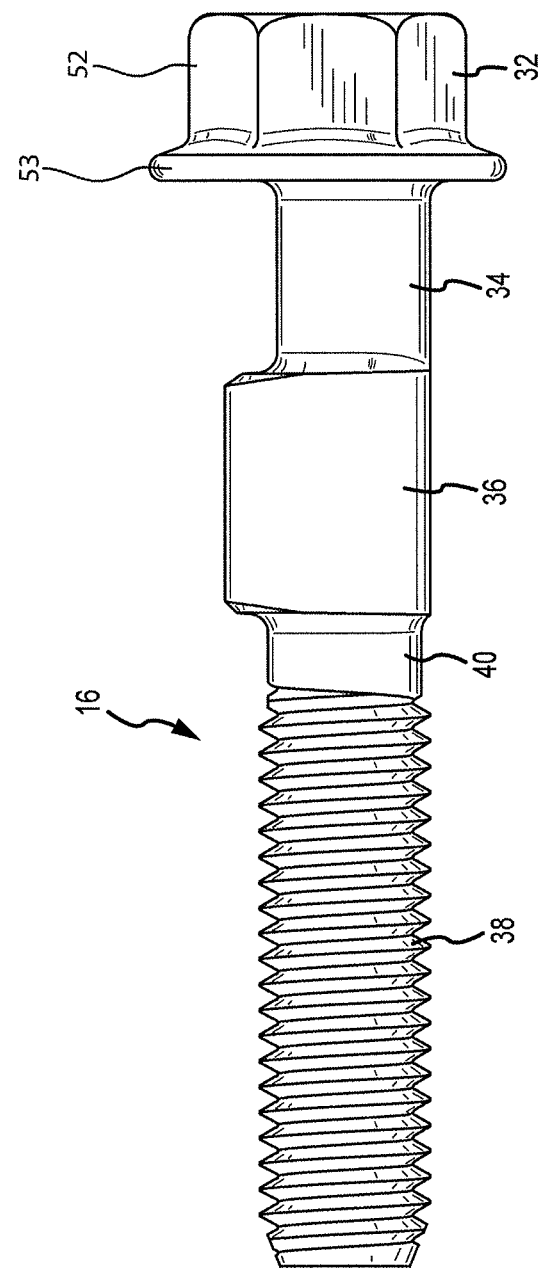

ADJUSTMENT BOLT FOR ADJUSTING CAMBER ANGLE

CROSS REFERENCE TO RELATED APPLICATIONS

This application is a continuation-in-part of U.S. patent application Ser. No. 13/035,344 entitled "Adjustment Bolt for Adjusting Camber Angle," filed on 25 Feb. 2012, the disclosure of which is hereby incorporated herein by reference in its entirety.

FIELD

The present disclosure relates generally to an apparatus for adjusting camber in a vehicle, and more specifically, to a fastener apparatus for adjusting camber in a vehicle suspension system.

BACKGROUND

The camber angle, referred to simply as camber in the automotive trade, is the variance in degrees measured between true vertical and that of the measured vertical axis of the wheel as viewed from the front or back. Most vehicles are developed and produced with camber specifications recommended and published by the manufacturer. Camber, in combination with suspension design and other wheel alignment specifications, is developed to best meet a vehicle's handling and tire wear expectations. Many vehicles do not provide for a built in method of adjusting camber. In other words, the wheel assembly may be securely attached to the suspension system, which may make adjusting the camber angle more difficult. In these vehicles, the arrangement may include a generally vertical suspension strut including a knuckle assembly operably connected to a lower portion thereof. The knuckle may then attach to a wheel spindle (which connects to the wheel). Although these vehicles may be made to have a non-adjustable camber angle, to keep a vehicle in specification for optimized handling and tire wear attributes, camber may need to be adjusted from time to time. Bolts, cam shaped washers, other fastener assemblies, and grinding bolt holes into slots have been used to mechanically alter camber on vehicles with these "non-adjustable" suspension systems. However, each suspension system may include differently sized apertures to receive the fasteners, and different sized or shaped bolts may be needed to maximize camber change for each different suspension system. This may require mechanics and/or automobile part stores to stock a number of different bolts to best serve the market.

SUMMARY

The present disclosure relates to an adjustment bolt for adjusting camber in a vehicle. The adjustment bolt may include a head, a neck, a lobe (or cam), and a threaded portion. The head may be configured to provide a gripping surface for a tightening tool (e.g., pliers, wrench). The head has a first diameter and a first centerline. The neck extends eccentrically from the bottom surface of the head and the neck has a second diameter and a second centerline. The lobe extends eccentrically outward from a bottom surface of the neck and the lobe has a third diameter and a centerline that is the same as the first centerline. The threaded portion extends eccentrically outward from a bottom surface of the lobe and has a third centerline. The first centerline, the second centerline, and the third centerline are different from one another and the lobe diameter is substantially the same as an aperture diameter for an adjustment aperture in a knuckle operably connected to the vehicle.

Other embodiments may include an adjustment assembly for adjusting the camber in a vehicle. The adjustment assembly may include an adjustment washer and an adjustment bolt configured to be inserted into the adjustment washer. The adjustment washer includes a prong extending away at a first angle from a body of the washer, and a tang extending in the opposite direction from the prong, but perpendicularly to the body of the adjustment washer. The tang is configured to be inserted into a receiving aperture on a U-bracket or flange operably connected to a vehicle suspension system. The adjustment bolt includes a head, a neck, a cam or lobe, and a threaded portion. The head forms a first end of the adjustment bolt. The neck extends eccentrically from a bottom surface of the head and is substantially cylindrically shaped and has a neck centerline. The lobe extends eccentrically from a right bottom surface of the neck, opposite of the head. The lobe is substantially cylindrically shaped and has a cam centerline. The threaded portion extends eccentrically outward from the lobe and includes a plurality of threads wrapping around an outer wall. The threaded portion has a major thread diameter corresponding to a crest to crest distance between threads on a top surface and a bottom surface of the outer wall, a root diameter corresponding to a valley to valley distance between the threads on the top surface and the button surface, and a third centerline. The first centerline, the second centerline, and the third centerline are different from one another and the major diameter is selected so that a crest of at least one thread of the plurality of threads is configured to engage a bottom inner wall of a receiving aperture of a U-bracket when the adjustment aperture is at least partially received within the receiving aperture.

Still other embodiments include a method for adjusting camber in a vehicle. The method may include sliding an adjustment washer onto an adjustment bolt. The adjustment washer includes a prong extending away at a first angle from a body of the washer, and a tang extending in an opposite direction perpendicularly to the body of the washer. The tang is configured to be inserted into a receiving aperture on a flange operably connected to a strut of a vehicle suspension system. The adjustment bolt includes a head, a neck, a lobe, and a threaded portion. The head forms a first end of the adjustment bolt. The neck extends eccentrically from a bottom surface of the head, it is substantially cylindrically shaped with a neck centerline. The lobe extends eccentrically from a right bottom surface of the neck, opposite of the head. The lobe is substantially cylindrically shaped and has a lobe centerline. The threaded portion extends eccentrically from a right bottom surface of the lobe such that along a right side surface of the adjustment bolt, the neck, the lobe and a major diameter of the threaded portion are effectively flush. Additionally, the threaded portion has a thread centerline which differs from the lobe and neck centerlines. After the adjustment washer has been inserted onto the adjustment bolt, the threaded portion of the adjustment bolt is inserted into a receiving aperture on a flange operably connected to a strut of a vehicle. Then, the tang of the adjustment washer is inserted into the receiving aperture, such that a bottom surface of the washer may be substantially flush with a first outer surface of the flange. A nut is applied to the threads of the bolt and it is loosely tightened. After the nut and adjustment bolt have been loosely tightened the tang is oriented inward or outward horizontally depending on the kind of camber change required. The adjustment bolt is then rotated within the receiving aperture to obtain a desired camber angle.

BRIEF DESCRIPTION OF THE DRAWINGS

FIG. 4A is a front elevation view of the adjustment bolt illustrated in FIG. 3.

DETAILED DESCRIPTION

The present disclosure relates to an adjustment bolt for adjusting the camber angle of a wheel for a vehicle. The adjustment bolt may be incorporated as part of an adjustment assembly that may be used to operably connect a knuckle supporting a wheel hub to a suspension strut. The adjustment bolt includes a head, a neck, a lobe or cam, and a threaded portion. The head and lobe may share a same centerline, whereas the threaded portion and the neck have different centerlines from each other and from the head and lobe. In other words, the lobe and head have a first centerline, the neck has a second centerline and the threaded portion has a third centerline. Thus, the adjustment bolt has three separate centerlines or symmetry axes. As the adjustable bolt has three different centerlines, the major diameter of the threaded portion may stay within the outer diameter of the lobe. This allows for a single size adjustable bolt to be used for multiple suspension systems with varying apertures. This may reduce the number of stock keeping units (SKUs) required to be stocked in an automobile parts store, mechanic or the like. Additionally, the multiple centerlines may also allow for a greater camber angle change, as the lobe may be created larger, having a larger offset with respect to the neck, this additional lobe size and offset with respect to the neck in turn permits a thicker washer tang, which may allow for approximately a 20% increase in adjustment angle. This is an example only. The percentage gain depends on several factors. As a general guide, the linear gain in adjustment will be about one-fourth of the difference between thread major and minor diameters (assuming the same threads are used on both bolts).

Additionally, along a first plane a major diameter of the thread portion (i.e., the diameter measured from a maximum height of each thread) is configured to be flush or effectively flush with the neck diameter and a lobe diameter. In this embodiment, the plane hits the top surface of the threads, the neck and the lob in a straight line that is parallel to a horizontal axis of the adjustment bolt. However, on a second plane the lobe diameter is not flush either with the neck or a major diameter of the threads. Thus, as viewed from a rear elevation view one side of the adjustment bolt aligns on a single plane, and on a second side the various portions of the adjustment bolt align on separate planes. As the major diameter of the threads is flush with one plane of the lobe and all the planes of the neck, the adjustment bolt may be able to be inserted into receiving apertures up to the lobe diameter. This is beneficial as fewer bolt diameter embodiments (e.g., SKUs) may need to be stored by mechanics, automobile part stores, and the like, in order to accommodate most vehicle suspension systems and also because it enhances the amount of change possible for a given receiving aperture size.

Figure 1:
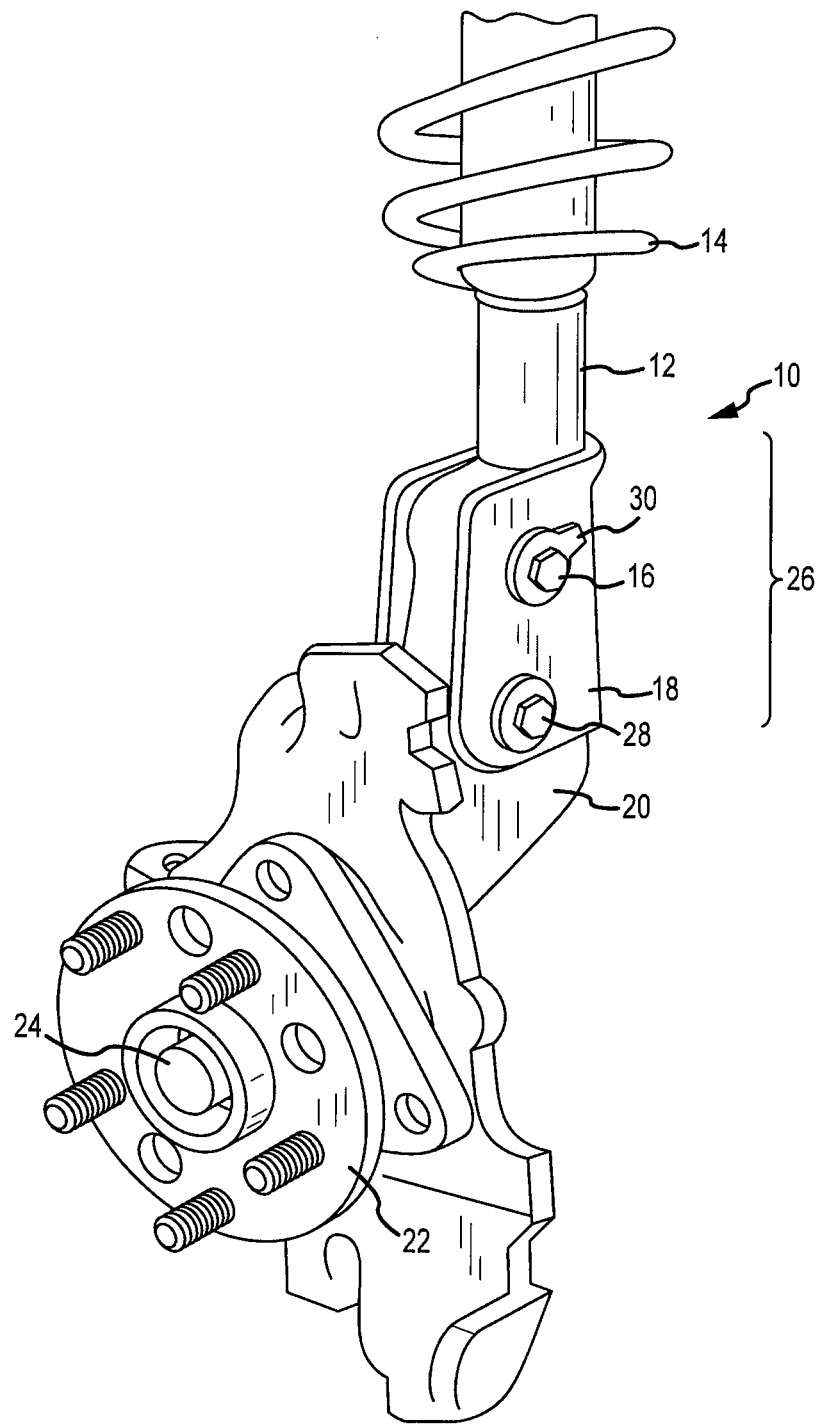
FIG. 1 is an isometric view of a portion of a vehicle suspension system including a suspension strut operably connected, via an adjustment assembly, to a knuckle assembly. The knuckle assembly is connected to a wheel hub.

FIG. 1 is an isometric view of a vehicle suspension system 10 including a suspension strut 12 operably connected via an adjustment assembly 26 to a knuckle assembly 20. The knuckle 20 is operably connected to a wheel hub 22. The suspension system 10 may be connected between a vehicle and a wheel (not shown) of the vehicle. The suspension system 10 may be used to steer the vehicle, as well as provide comfort for passengers within the vehicle by reducing shock from motion of the vehicle from entering into the vehicle. The suspension system 10 illustrated in FIG. 1 is for a single wheel of a vehicle and the other half of the entire vehicle suspension is not shown. However, the other half of the suspension system may be essentially the same as the suspension system 10 illustrated in FIG. 1. The suspension system 10 includes a strut 12 and a spring 14 which are operably connected to the knuckle 20 via an adjustment assembly 26. The knuckle 20 may then be operably connected to a wheel hub 22 via a spindle 24.

The strut 12 and the spring 14 support the vehicle body, while providing damping and control for the vehicle. The strut 12 may consist of a generally vertical cylindrical body and the spring 14 wraps around the outer surface of the strut 12. The adjustment assembly 26 operably connects to the strut 12 via a U-bracket 18 or flanges extending from the strut 12. For example, as shown in FIG. 1, the U-bracket 18 is inserted around a lower body of the strut 12, such that the strut 12 is surrounded on three sides. The U-bracket 18 receives an upper portion of the knuckle 20 and then an adjustment bolt 16 and a fastener 28 secure the knuckle 20 and U-bracket 18 to the strut 12. In some embodiments, the U-bracket 18 may be replaced by flanges extending from a lower portion of the strut 12 (see, e.g., FIG. 2). In these embodiments, the knuckle 20 may be inserted in between the two flanges, which substantially act as a U-bracket by utilizing the body of the strut 12 as the back portion. A wheel hub 22 may then connect to a spindle 24 extending from the knuckle 20. The wheel hub 22 operably connects to a wheel (not shown) for the vehicle. It is contemplated that some vehicles have struts that do not include a spring. If these spring-less struts use two bolts to connect to the knuckle, then the bolt described herein is able to be utilized and performs the same or similar function. Both of adjustment bolts 16 and 28, or either, may be camber adjustment bolts as described herein.

The adjustment assembly 26 may be used to vary a camber angle of the wheel hub 22 (and wheel) when it is connected to the knuckle 20. Camber is the variance in degrees measured between true vertical and that of the measured vertical axis of the wheel assembly (when viewed from the front or the rear). For example, if the top of a wheel is farther away from the center line of the vehicle than the bottom of the wheel, the camber angle is positive. On the other hand, if the top of the wheel is closer to the centerline of the vehicle than the bottom of the wheel, the camber angle is negative. The camber angle may affect the handling qualities of a vehicle. For example, a negative camber angle may improve the grip of the tires while the vehicle is cornering. Camber angle directly affects handling and tracking of the vehicle as well as tire wear. Generally adding more negative camber will improve these characteristics, while positive settings will reduce these characteristics. If even tire wear is prioritized over handling, the adjustment assembly would be used to reduce camber closer to zero. Additionally, an excessive (e.g., too large) camber angle in any direction may increase tire wear, as well as impair handling. The adjustment assembly 26 alters the position of the knuckle 20 within the U-bracket 18 and with respect to the strut 12, so as to alter the camber angle.

Figure 2:
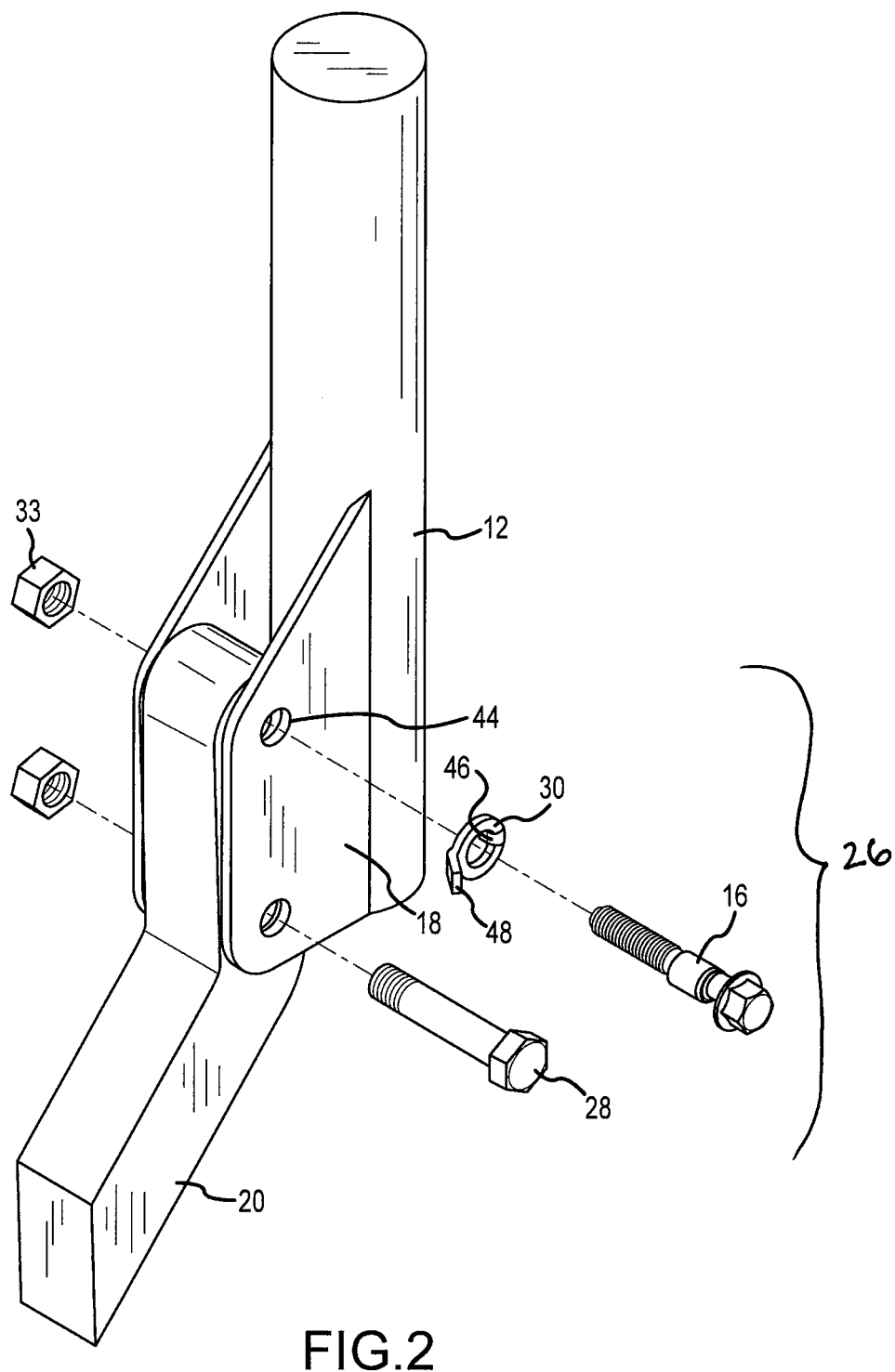
FIG. 2 is an exploded isometric view of the suspension strut operably connected to a portion of the knuckle via the adjustment assembly.

FIG. 2 is an exploded view of the adjustment assembly 26 operably connecting the strut 12 to the knuckle 20. The adjustment assembly 26 includes an adjustment bolt 16, a fastener 28 or bolt, an adjustment washer 30, and a locking nut 33. The fastener 28 operably connects one portion of the knuckle 20 to the U-bracket 18. The fastener 28 may be a bolt, screw or any other fastening device that may securely fasten the knuckle 20 to the U-bracket 18. The fastener 28 may substantially prevent the knuckle 20 from rotating within the U-bracket 18. The fastener 28 may be operably connected to the knuckle 20 and the U-bracket 18 with a washer, nut and the like.

The adjustment washer 30 may include a prong 48 and a tang 46. The adjustment washer 30 is used in combination with the adjustment bolt 16 to adjust the camber angle for the vehicle. It should be noted that the washer 30 is shown as generally circularly shaped, but that the washer 30 or just the inner diameter thereof my be non-circularly shaped. As shown in FIG. 2, the tang 46 extends perpendicularly from a bottom surface of the adjustment washer 30. However, the tang 46 may extend at angles other than perpendicular from the bottom surface of the adjustment washer 30. Additionally, although the tang 46 is shown as being relatively planar, in some instances the tang 46 may be curved to relatively match the outer diameter of the neck of the adjustment bolt 16, or it may be otherwise curved. The tang 46 may be inserted around a portion of the adjustment bolt 16 and placed within a receiving aperture 44 in the U-bracket 18. The tang 46 helps secure the adjustment bolt 16 in a proper orientation within the receiving aperture 44. Extending on an opposite side of the adjustment washer 30 is a prong 48. The prong 48 may extend away from a main body of the washer 30 at a slight angle, so that when the washer 30 is placed against the outer surface of the U-bracket 18, the prong 48 extends away from an outer surface of the U-bracket 18. The prong 48 allows a user to fit the tang 46 within the receiving aperture 44, in order to best position the adjustment bolt 16 and washer 30 within the receiving aperture 44 for the direction of change as desired.

Figure 3:
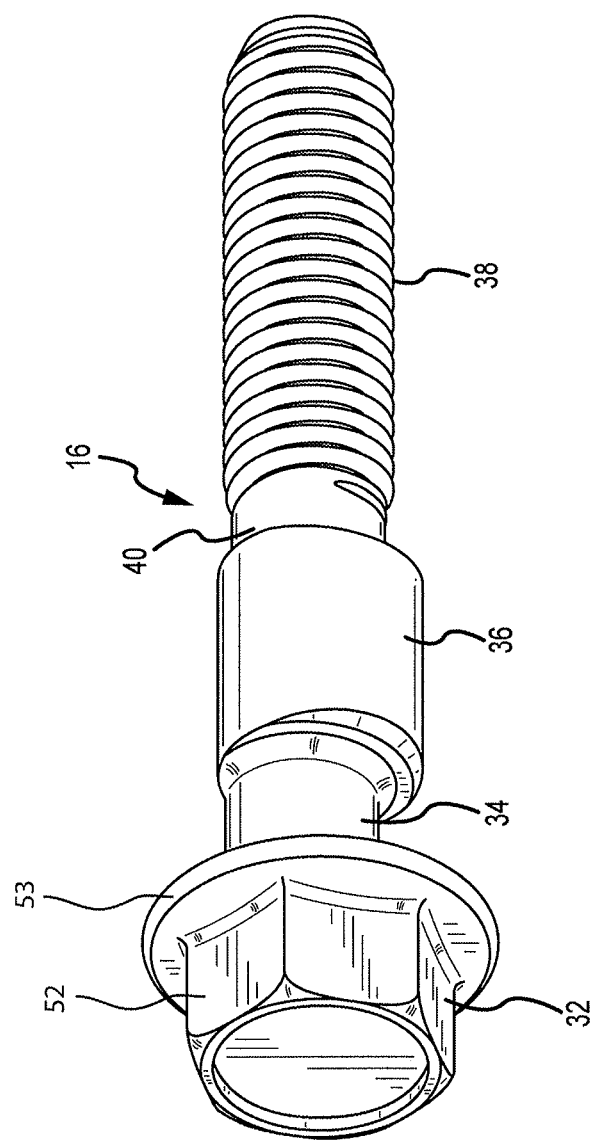
FIG. 3 is an isometric view of an adjustment bolt forming a part of the adjustment assembly illustrated in FIG. 2.
Figure 4B:
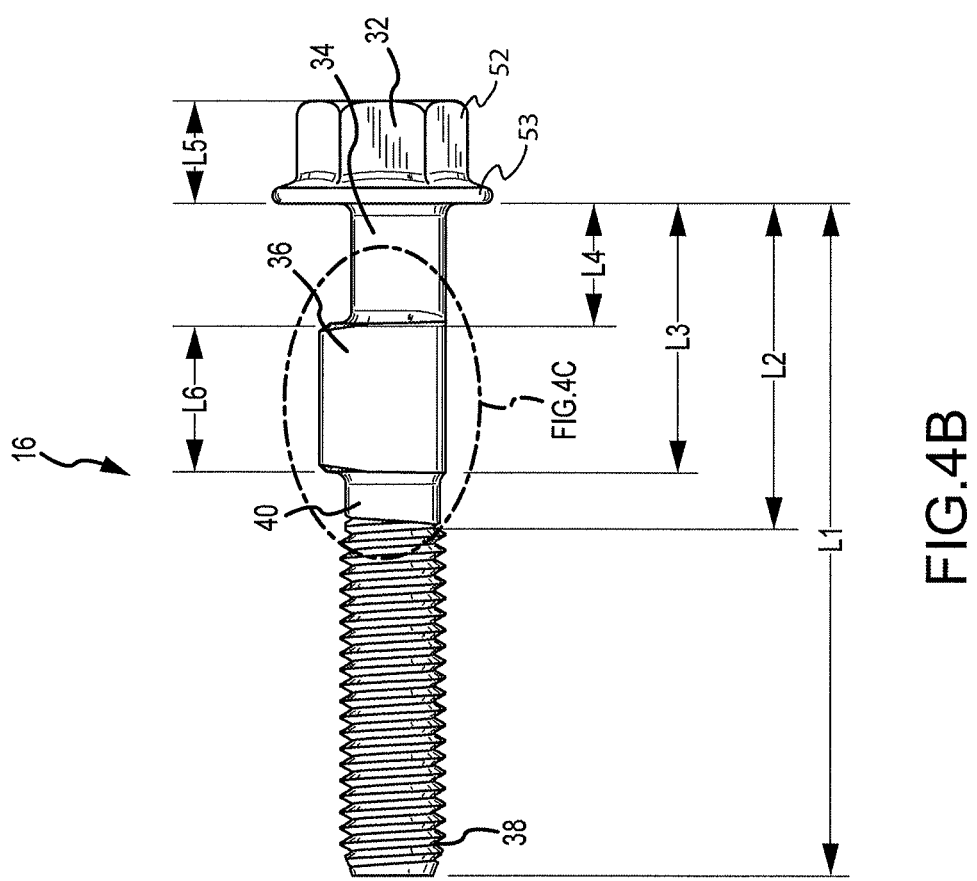
FIG. 4B is a front elevation view of the adjustment bolt illustrated in FIG. 3 showing various dimensional features.
Figure 4C:
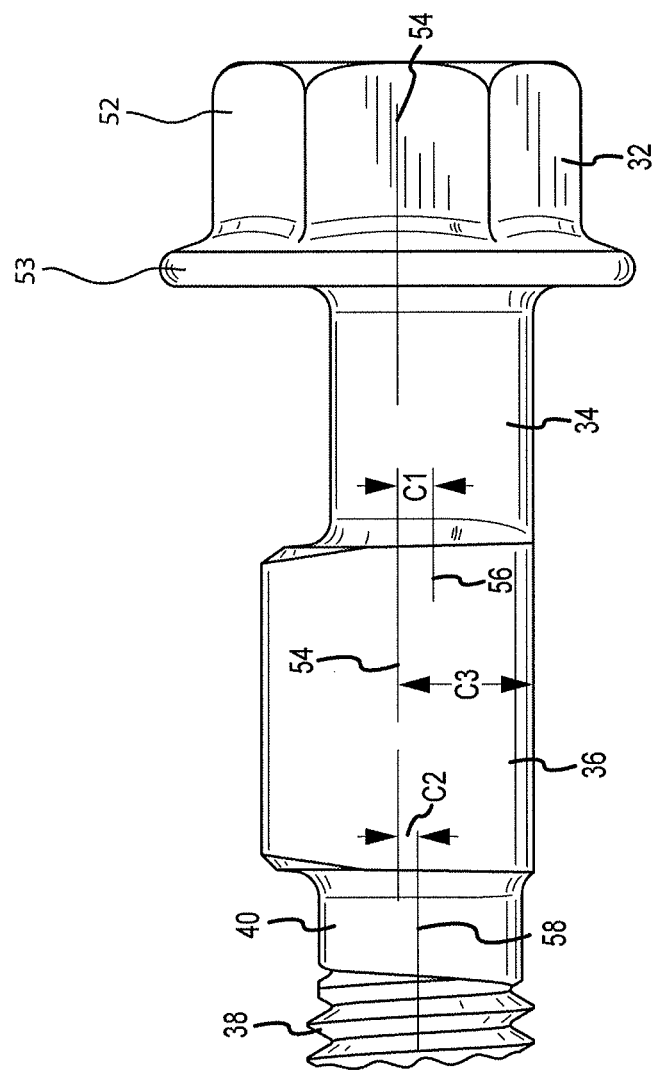
FIG. 4C is an enlarged rear elevation view of a head, neck and lobe of the adjustment bolt illustrated in FIG. 4B.

FIG. 3 is an isometric view of the adjustment bolt 16, FIG. 4A is a front elevation view of the adjustment bolt, FIG. 4B is a rear elevation view of the adjustment bolt 16, and FIG. 4C is an enlarged rear view of a portion of the adjustment bolt 16 illustrated in FIG. 4B. The adjustment bolt 16 includes a head 32, a neck 34, a lobe 36 or cam, a threaded portion 38, and a transition portion 40. The adjustment bolt 16 is configured to be inserted into the receiving apertures 44 on the U-bracket 18 and held in place via the adjustment washer 30, and a locking nut 33. The adjustment bolt 16 extends through the receiving apertures 44 and an adjustment aperture 50 (see, e.g., FIGS. 10A and 10B) on the knuckle 20. A part of each the neck 34, the lobe 36 and the threaded portion 38 are retained within the adjustment aperture (such as aperture 50 in FIG. 10A), and then the threaded portion 38 extends out past the second receiving aperture 44 and the nut 33 is secured around the exposed threaded portion 38. The adjustment bolt 16 may be steel, steel alloy (e.g., 4140 steel, 5140 steel), or other materials with similar properties.

Referring to FIGS. 4A and 4B, the head 32 is configured to provide a gripping surface for a wrench, pliers, or other similar tightening or adjusting tools to allow the adjustment bolt 16 to be rotated within the adjustment aperture 50 and receiving apertures 44. Thus, the head 32 may include a faceted or hexagonal shaped body 52. The body 52 then expands outwards to form a plate 53. The plate 53, also referred to commonly as a flange, is configured to rest along an outer surface of the adjustment washer 30 when the adjustment bolt 16 is operably connected to the strut 12. The head 32 has a length L5 (FIG. 4B) measured from a bottom surface of the plate 53 to the front surface of the body 52. The length L5 is essentially the thickness of the head 32 and may be varied to accommodate differently sized adjustment tools, as well as differently sized receiving apertures 44. In some embodiments, the head 32 may be replaced with a bolt head and generally circular or other shaped washer. In these instances, the plate 53 may be a separate washer that may be operably connected to the bolt 16.

Referring generally to FIGS. 4A-4C, after the head 32, the adjustment bolt 16 transitions into the neck 34. The neck 34 extends eccentrically from a bottom surface of the plate 53 and has a smaller diameter than the plate 53. The neck 34 includes a length L4 that in some embodiments may range between approximately 11.2 mm (0.44 inches) and 12.6 mm (0.49 inches). However, it should be noted that the neck 34 length L4 may be any dimension, as long as the lobe 36 may be positioned within the receiving aperture 44 and still be within the adjustment aperture 50. Additionally, the neck 34 has a neck centerline 56. The neck centerline 56 is located at a different position from the head centerline 54. The neck centerline 56 is located at a distance C1 below the head centerline 54. The distance C1 between the neck centerline 56 and the head centerline 54 may range between approximately 1.02 mm (0.04 inches) to approximately 1.55 mm (0.061 inches). In this manner, the center or symmetry axes of the head 32 and the neck 34 are aligned different from one another, such that the neck 34 may be eccentrically aligned with respect to the head 32.

The lobe 36 extends eccentrically outwards from a bottom right surface of the neck 34. The lobe 36 is eccentrically aligned with the neck 34, such that along a right surface the head 32, the neck 34 and the lobe 36 intersect at a same plane. The lobe 36 has a larger overall diameter than the neck 34, the transition region 40 and the threaded portion 38. The lobe 36 has a length L6, and the length L6 may be larger than the length L4 of the neck 34. For example, in some embodiments the length L6 may be approximately 0.55 inches and the length L4 may be approximately 0.45 inches. However, in other embodiments, both the length L6 and the length L4 may be approximately 0.50 inches; and furthermore, the lobe length L6 may be shorter than the neck 34 length L4.

The combination of the lobe 36 and the neck 34 has a length L3, measured from an end of the lobe 36 to the bottom surface of the plate 53. In some embodiments, the length L3 may be approximately 1 inch. However, this length L3 may be any dimension as long as the length L3 is approximately less than a length of the adjustment aperture 50 (e.g., a thickness of the knuckle 20) plus the thickness of the receiving apertures 44. This may help to ensure that the lobe 36 may not become engaged with the second receiving aperture 44 (on the opposite side of the U-bracket 18), which could prevent the adjustment bolt 16 from adjusting the camber. The lobe 36 and the head 32 have the largest diameters of the adjustment bolt 16. The lobe 36 has a lobe centerline or axis, and this centerline 54 is equal to the head 32 centerline 54. In other words, the lobe 36 and the head 32 are positioned, with respect to one another, such that the same bisecting line may intersect halfway between each the head 32 and the lobe 36. The lobe 36 then decreases in diameter to form the transition region 40 which then expands to form the threaded portion 38. The transition region 40 extends from a right bottom surface of the lobe 36, such that the transition region 40 is eccentrically aligned with the lobe 36.

The lobe 36, the neck 34 and the transition region 40 have a length L2, measured from the beginning of the threads forming the threaded portion 38 to the bottom surface of the plate 53. The length L2 may be designed such that the adjustment bolt 16 may extend past the U-bracket 18 far enough to allow the locking nut 33 to be secured to the adjustment bolt 16. Finally, the adjustment bolt 16 has a length L1 as measured from the bottom surface of the adjustment bolt 16 (i.e., the end of the threaded portion 38) to the bottom surface of the plate 54. This length L1 may be altered to accommodate a different size strut 12, U-bracket 18, and/or knuckle 20. The length L1 may determine the percentage or portion of the adjustment bolt 16 that extends outwards past the second receiving aperture 44 within the U-bracket 18.

Figure 5A:
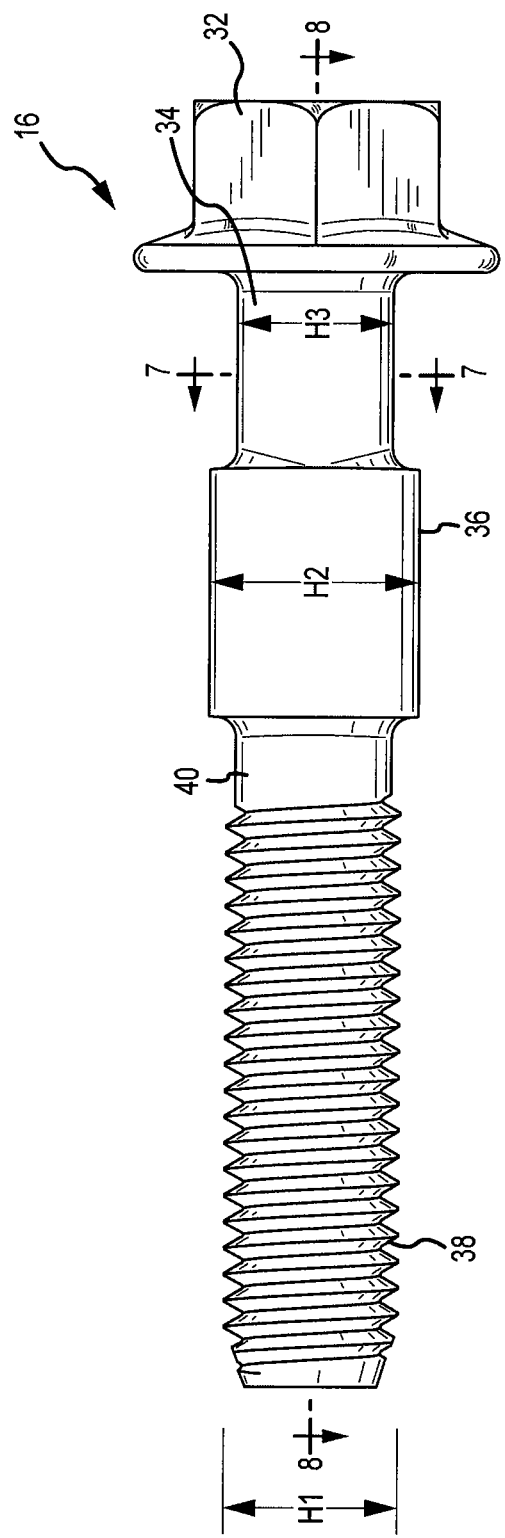
FIG. 5A is a right side elevation view of the adjustment bolt illustrated in FIG. 3.
Figure 5B:
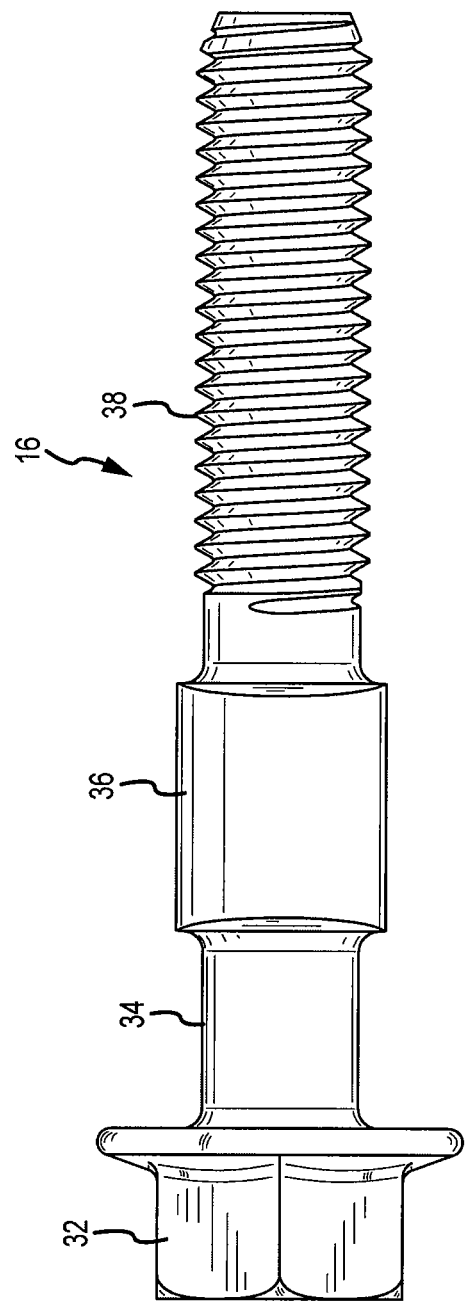
FIG. 5B is a left side elevation view of the adjustment bolt illustrated in FIG. 3.

FIG. 5A is a right elevation view of the adjustment bolt 16 and FIG. 5B is a left elevation view of the adjustment bolt 16. The neck has a diameter H3, the lobe has a diameter H2, and the threaded portion 38 has a diameter H1. As used herein, the word diameter is contemplated to mean the major axis of an object with a circular periphery, as well as the major axis of an object that does not have a circularly periphery, such as an oval or ellipse. As can be seen in FIG. 5A, each diameter H1, H2 and H3 may be different. For example, in one embodiment, H1 may be approximately 0.30 inches, H2 may be approximately 0.470 inches, and H3 may be approximately 0.351 inches. However, in other embodiments, the diameters H1, H2, H3 may have different dimensions, as long as H2 remains the largest, H1 remains the second largest and H3 is the smallest, comparatively. In one example, it should be noted that the height H3 of the neck 34 does not have to be smaller than H1 the threaded portion 38; however, in most embodiments it typically may be smaller. As long as the neck 34 is as strong or stronger than the threaded portion 38, the diameter of the neck 34 H3 may be any size as compared with the diameter of the threaded portion H1. To enhance the potential for change to a large extent without 'wasting', or not efficiently using, space for neck size that cannot add strength, the neck diameter may be the same as the thread minor diameter so that strength will be roughly equivalent or the same. This allows a significantly increased practical difference in diameters H2 (lobe) and H3 (neck). When matched with a washer tang that is roughly equal to that difference, this arrangement may deliver the a significantly enhanced level of change.

Referring to FIGS. 4C and 5A, the varying heights or diameters H1, H2, H3 of the neck 34, the lobe 36 and the threaded portion 38, as well as the eccentric alignment of each the head 32, the neck 34, the lobe 36 and the threaded portion 38, contribute to the varying centerlines 54, 56, 58 for each the neck 34, the lobe 36 and the threaded portion 38. The head 32 and the lobe 36 have the same centerline 54, the neck 34 has neck centerline 56 and the threaded portion 38 (and transition region 40) has a thread centerline 58. It should be noted that in some instances the head 32 may define a centerline that may be coaxial with any of the centerlines of the lobe 36, neck 34, and/or threaded portion 38, or the head 32 may have a centerline that is offset from two or all of the other centerlines. In other words, although as shown in FIG. 4C, the head 32 may have the same centerline as the lobe 36, in other embodiments the head 32 may have a fourth centerline (different from the neck 34, lobe 36, and threaded portion 38), or the head 32 may have a centerline that is the same as the neck 34 or threaded portion 38.

The adjustment bolt 16 thus has three centerlines 54, 56, 58, and each centerline is different. For example, the head 32 and lobe 36 centerline 54 is spaced apart from the neck centerline 56 by a distance C1. This distance C1 may range between approximately 1 mm (0.039 inches) to approximately 1.55 mm (0.061 inches) and may be determined by the desired range of camber adjustment, and/or strength of the adjustment bolt 16 relative to the original bolt. Additionally, the head and lobe centerline 54 is spaced apart from the thread centerline 58 by a distance C2. This distance C2 is less than C1, such that the diameter H1 of the threaded portion 38 is flush to the neck 34. Note that the preceding is an example only. The benefits of a 3-axis bolt configuration as described herein is that C2 would be less than C1 by an amount that, when all edges stay on a 'common plane', the thread strength is matched to the neck strength by making the thread minor diameter match the neck diameter.

The three different centerlines 54, 56, 58 allow the adjustment bolt 16 to have an increased range of movement, as compared with other bolts. Prior art bolts used for adjusting the camber angle were designed so that the threaded area and the neck had the same axis or centerline. Thus, there may have been only two centerlines for the bolt. On the other hand, the adjustment bolt 16 has three separate centerlines 54, 56, 58. These centerlines increase the range of movement that the adjustment bolt 16 may provide to the knuckle 20 within the U-bracket 18. This is because the movement that the adjustment bolt 16 provides to the knuckle 20 may be a function of an offset between the neck 34 and lobe 36 centerlines 54, 56, as well as the "slop" in the receiving apertures 44 of the U-bracket 18 and/or the adjustment aperture 50 in the knuckle 20. The ability of the adjustment bolt 16 to fit a large C1 centerline offset distance into a given receiving aperture 44 and/or adjustment aperture 50, allows the adjustment bolt 16 to provide a greater camber range for a given suspension system. This additional range may occur if the 3-axis' lobe size is enlarged to include the portion of the 2-axis' thread that was over-flush to the original lobe size.

Figure 6:
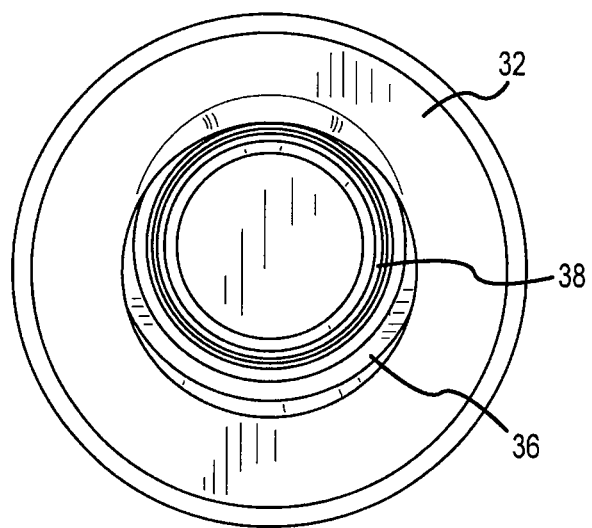
FIG. 6 is a bottom plan view of the adjustment bolt illustrated in FIG. 3.
Figure 7:
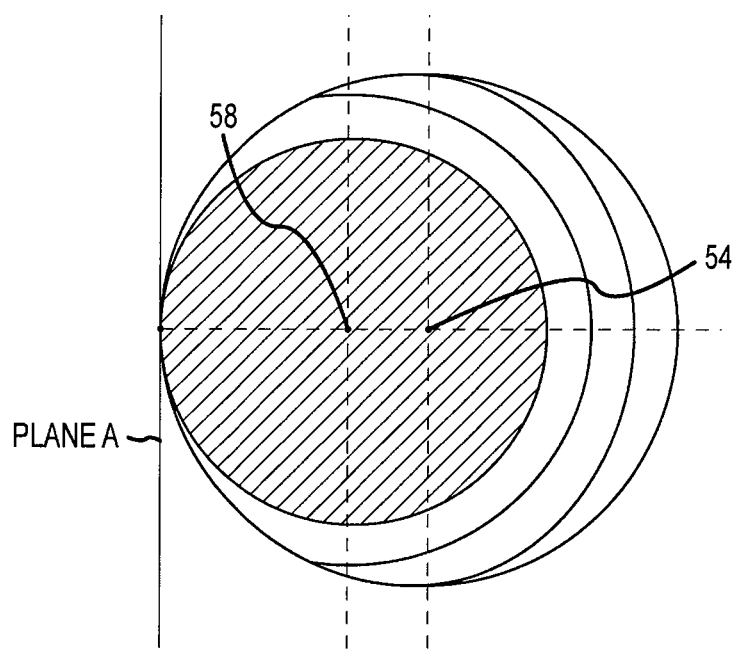
FIG. 7 is a cross-section view of the adjustment bolt illustrated in FIG. 3, viewed along line 7-7 in FIG. 5A.
Figure 8:
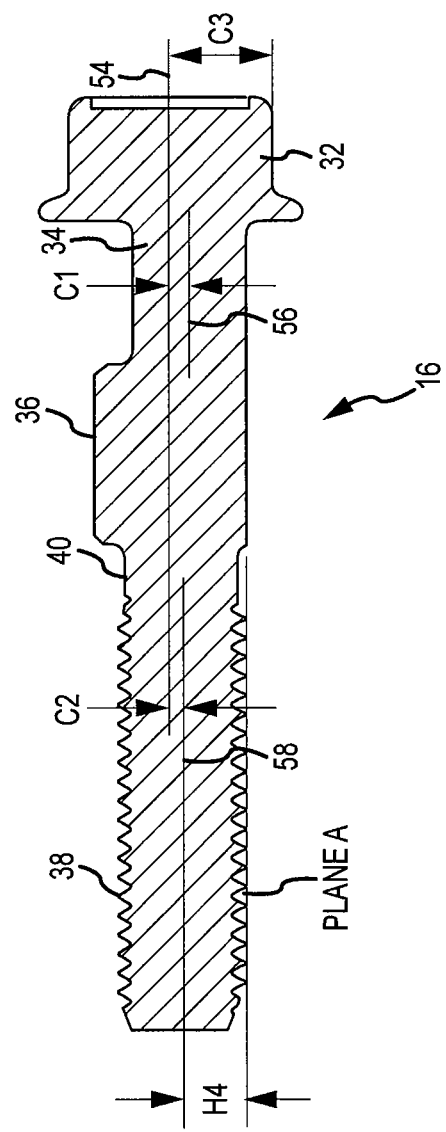
FIG. 8 is a cross-section view of the adjustment bolt illustrated in FIG. 3, viewed along line 8-8 in FIG. 5A.

FIG. 6 is a bottom plan view of the adjustment bolt 16, FIG. 7 is a cross-section view of the adjustment bolt 16 viewed along line 7-7 in FIG. 5A, and FIG. 8 is a cross-section view of the adjustment bolt 16 viewed along line 8-8 in FIG. 5A. The threaded portion 38, the lobe 36, the transition portion 40 and the neck 34 align on one side of the adjustment bolt 16. In one embodiment, this may be a right side of the adjustment bolt 16. As shown in FIGS. 7 and 8, the threaded portion 38, the transition portion 40, the lobe 36, and the neck 34 all align on Plane A. The threaded portion 38 aligns on a major diameter of the threads with the outer diameter of the lobe 36 and neck 34, in other words, the maximum diameter of the threaded portion 38 intersects Plane A. At least a single point on the outer diameter of each the lobe 36, the neck 34 and the threaded portion 34 intersects Plane A at the same location. As best seen in FIG. 7, the threaded portion 38, the transition portion 40, the lobe 36 and the neck 34 are effectively flush with Plane A, and thus intersect Plane A at the same point.

As the neck 34, the lobe 36, the transition portion 40, and a major diameter of the threaded portion 38 are effectively flush with one another, the adjustment bolt 16 may be used in smaller receiving apertures 44 than bolts used in the past to adjust the camber angle. As the adjustment bolt 16 may be used in smaller receiving apertures 44, the adjustment range for the camber angle may be increased due to less "slop" within the receiving apertures 44 and/or the adjustment aperture 50, and the number of parts or SKUs may be reduced. This is because the adjustment bolt 16 may fit more receiving apertures 44 and/or adjustment apertures 50, for different vehicles and suspension systems than bolts that may have been used in the past. Reducing the number of SKUs may allow an automobile parts store or mechanic to save money by having a reduced inventory. Additionally, the degree of camber angle adjustment may be increased to 2.16 degrees in either the positive or negative direction. This angle adjustment is increased over prior art bolts by about 0.5 degrees. This additional angle adjustment may make a significant difference in certain vehicles with "non-adjustable" suspensions systems, as it provides more adjustment room to better set the camber angle. Additionally, the benefit may either be more fitments from the same SKUs (if lobe size is maintained and the threads are moved to flush), or it can be used to provide additional change if the lobe size is instead increased to 'include' the over-flush thread of the old design. The actual gain where the lobe size is optimized in this manner is approximately half of the thread tip-to-root height (i.e. the amount that the material outer diameter 'grows' when making the threads via rolling). One example of typical outer diameter gain for metric coarse threads is about 0.6 mm, which for a typical 75 mm bolt separation distance gains adjustment amount of about +/−0.46 degrees.

Figure 9:
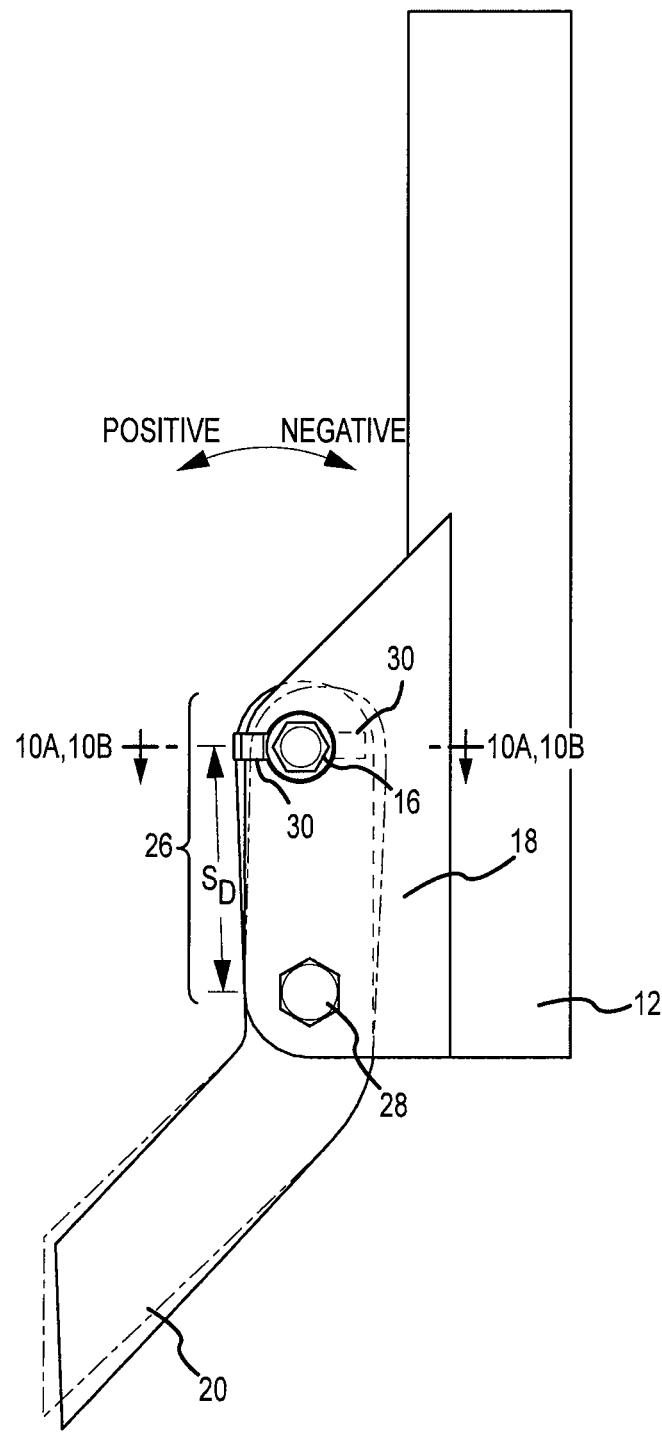
FIG. 9 is a side elevation view of the suspension strut connected to the knuckle via the adjustment assembly, illustrating the knuckle in a positive camber angle achieved via the adjustment assembly and in phantom the knuckle in a negative camber angle.

FIG. 9 is a side elevation view of the suspension strut 12 connected to the knuckle 20 via the adjustment assembly 26 and illustrating the knuckle 20 in a positive camber angle position achieved via the adjustment assembly 26 and in phantom illustrating the knuckle 20 in a negative camber angle position. The adjustment bolt 16 may be used to vary the camber angle of a wheel operably connected to the knuckle 20. The position of the tang 46 within the receiving aperture 44, as well as the position of the lobe 36 within the adjustment aperture 50 determines the camber angle of the knuckle 20. For example, referring to FIG. 10A, the tang 46 may determine whether the adjustment to the camber is in the positive or negative direction, and the position of the lobe 36 within the adjustment aperture 50 may determine the degree of angle change for the camber. Thus, the adjustment assembly 26 may be positioned (for instance installed, adjusted and clamped) such that the knuckle 20 may have a positive camber angle, a negative camber angle, or a neutral camber angle, all with respect to the vehicle (not shown).

Figure 10A:
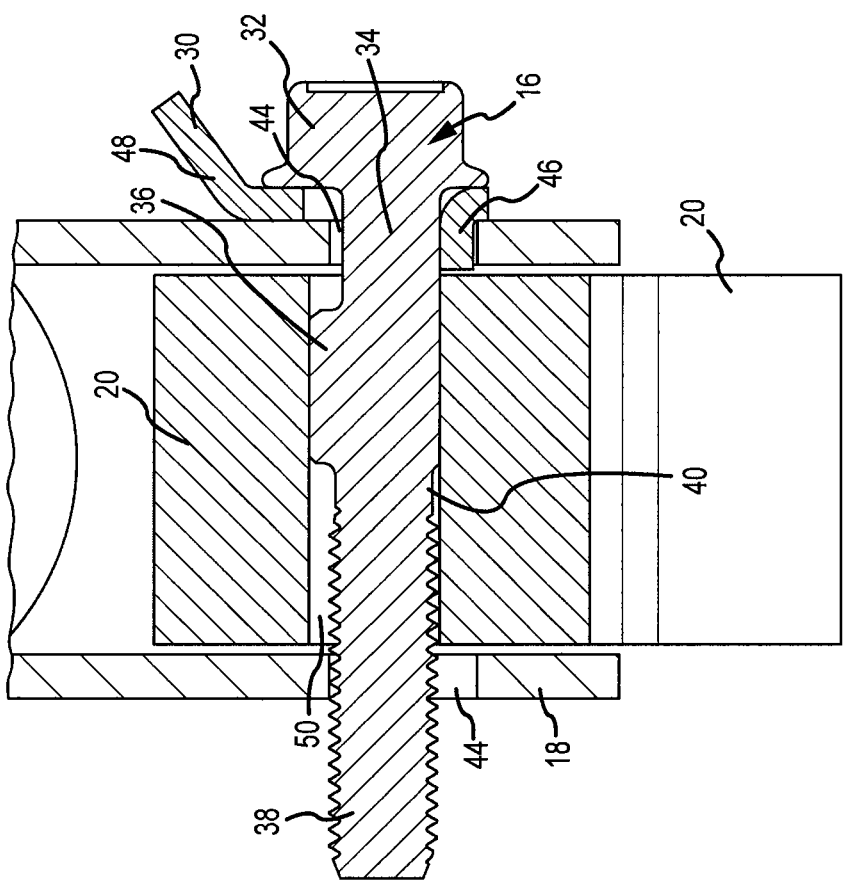
FIG. 10A is a cross-section view of the suspension strut connected to the knuckle via the adjustment assembly illustrated in FIG. 9, having a negative camber angle, viewed along line 10A-10A in FIG. 9.

FIG. 10A is a cross-section view of the suspension strut 12 connected to the knuckle 20 via the adjustment assembly 26 illustrated in FIG. 9 having a negative camber angle, viewed along line 10A-10A in FIG. 9. Referring to FIGS. 9 and 10A, when the lobe 36 is positioned within the adjustment aperture 50 so that the lobe 36 is facing backward towards the strut 12, the knuckle 20 may have a negative camber angle. This may be because the lobe 36 acts to push the knuckle 20 backward (away from a wheel) with respect to the U-bracket 18 and the strut 12. Thus, when a wheel is operably connected to the knuckle 20, a top portion of the wheel may be positioned toward the mid-plane of the vehicle.

Figure 10B:
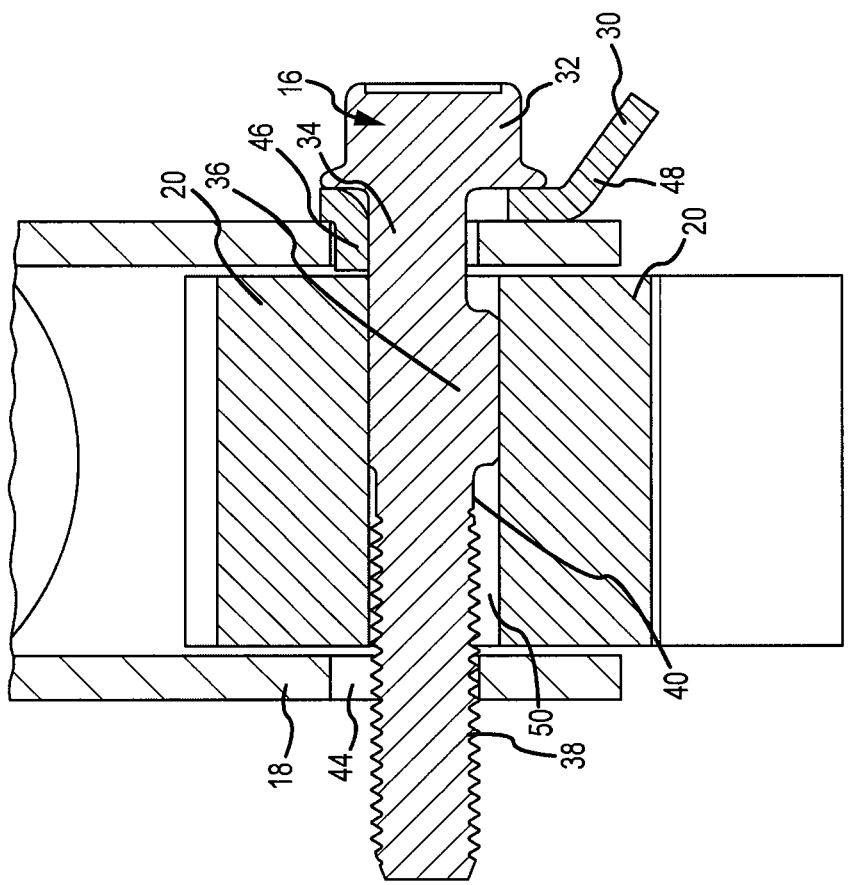
FIG. 10B is a cross-section view of the suspension strut connected to the knuckle via the adjustment assembly illustrated in FIG. 9, having a positive camber angle, viewed along line 10B-10B in FIG. 9.

FIG. 10B is a cross-section view of the suspension strut 12 connected to the knuckle 20 via the adjustment assembly 26 illustrated in FIG. 9 having a positive camber angle, viewed along line 10B-10B in FIG. 9. Referring now to FIGS. 9 and 10B, when the lobe 36 of the adjustment bolt 16 is positioned forward towards the knuckle 20, the knuckle 20 may have a positive camber angle. This may be because the lobe 36 acts to push the knuckle 20 forward (towards a wheel) with respect to the U-bracket 18 and the strut 12. Thus, when a wheel is operably connected to the knuckle 20, a top portion of the wheel may be positioned away from the mid-plane of the vehicle.

Figure 11:
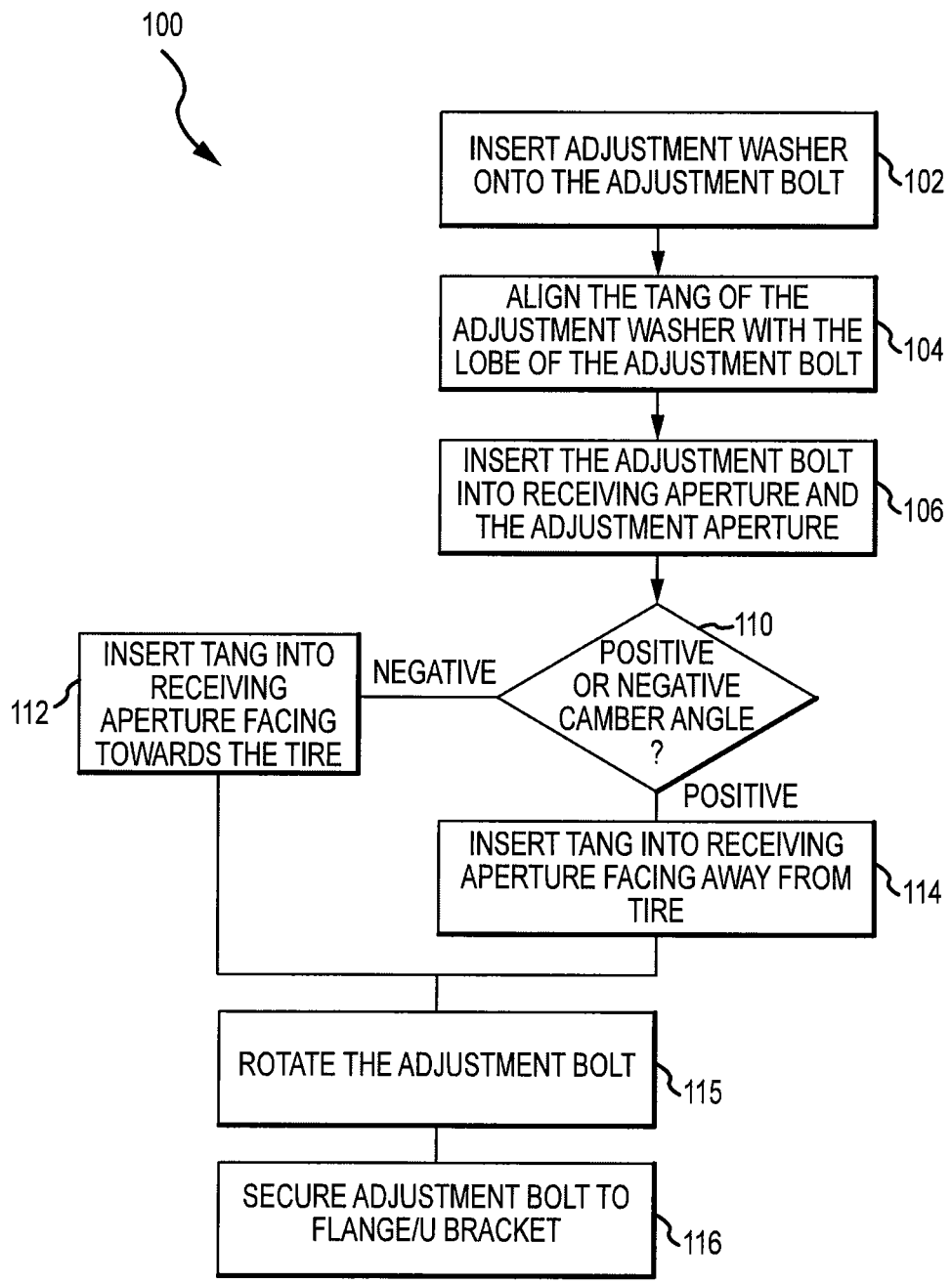
FIG. 11 is a flow chart illustrating a method for adjusting the camber angle on a vehicle using the adjustment assembly.

FIG. 11 is a flow diagram illustrating a method 100 for adjusting the camber angle of a vehicle. The method 100 begins with operation 102 and the adjustment washer 30 is inserted onto the adjustment bolt 16. For example, the adjustment washer 30 may be inserted around the threaded portion 38 and slid over the lobe 36 and around the neck 34. After operation 102, the method 100 proceeds to operation 104 and the tang 46 is aligned with the lobe 36 of the adjustment bolt 16. For example, the tang 46 should be positioned on the same side of the adjustment bolt 16 as the side of the lobe 36 that is not aligned with the neck 34 and major diameter of the threaded portion 38. In other words, the left side of the adjustment bolt 16, where the lobe 36 extends outwards past the threaded portion 38 and the neck 34. Once the tang 46 has been aligned with the lobe 36, the method 100 proceeds to operation 106. In this operation 106, the adjustment bolt 16 is inserted into the receiving aperture 44 and the adjustment aperture 50. The adjustment bolt 16 may be inserted so that the adjustment washer 30 is substantially flush with the U-bracket 18 or flange.

After the adjustment bolt 16 is inserted into the receiving aperture 44 and the adjustment aperture 50, the method 100 proceeds to operation 110. In this operation 110, the user determines whether the camber angle for the suspension system 10 needs to be adjusted in either the positive or negative direction. If the camber angle needs to be adjusted to a positive camber angle, the method 100 proceeds to operation 114. In operation 114, the tang 46 is inserted into the receiving aperture 44, such that it faces away from the tire or wheel of the vehicle. If, on the other hand, the camber angle needs to be adjusted to a negative camber angle, the method 100 proceeds to operation 112. In operation 112, the tang 46 is inserted into the receiving aperture 44 such that it faces towards the wheel or tire. It should be noted that if the adjustment bolt 16 is used in a lower receiving aperture on the U-bracket 18 (e.g., the receiving aperture for fastener 28 illustrated in FIG. 9), operations 112 and 114 may be reversed for achieving a positive or negative adjustment. In other words, if the adjustment bolt 16 is used in a lower receiving aperture, for positive adjustment the tang 46 may be inserted into the receiving aperture so that it faces towards the tire and for negative adjustment the tang 46 may be inserted into a lower receiving aperture so that it faces away from the tire. After operations 112, 114, the method 100 proceeds to operation 115 and the adjustment bolt 16 is rotated. As the adjustment bolt 16 rotates, the lobe 36 may be adjusted "out of phase" with the tang 46, creating a change in camber.

After operation 115, the method 100 proceeds to operation 116 and the adjustment bolt 16 is secured to the strut 12 and U-bracket 18. This operation 116 may involve inserting the locking nut 32 onto the adjustment bolt 16 and then tightening the locking nut 32 onto the threaded portion 38. However, the adjustment bolt 16 may be tightened to the strut 12 and/or the U-bracket 18 in other appropriate manners.

Figure 12:
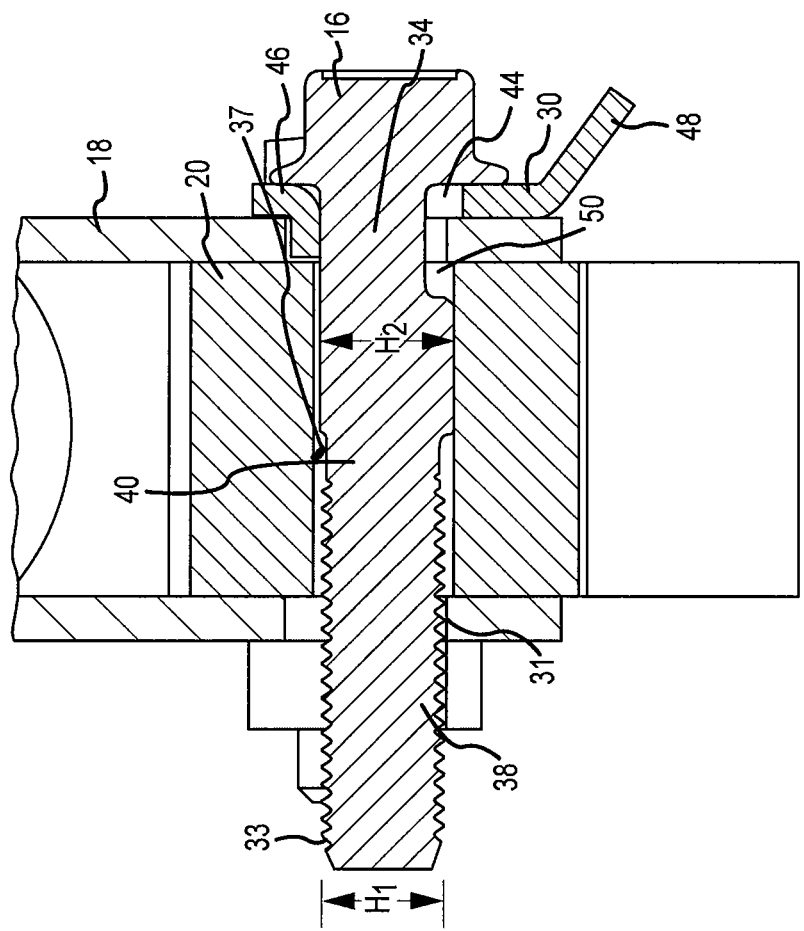
FIG. 12 is a cross-section view of suspension strut connected to the knuckle via the adjustment assembly illustrated in FIG. 9, and with the adjustment bolt having an increased thread root diameter, viewed along line 10A-10A in FIG. 9.

Other examples of the adjustment bolt and adjustment assembly will now be discussed. FIG. 12 is a cross-section view of suspension strut connected to the knuckle via the adjustment assembly and with the adjustment bolt having an increased threaded portion height or diameter, viewed along line 10A-10A in FIG. 9. With reference to FIG. 12 (and as also shown in FIGS. 10A and 10B), in some instances the receiving apertures 44 defined in the U-bracket 44 of the strut 12 may have a larger diameter than the adjustment aperture 50 defined within the knuckle 20. In these instances, the major diameter of the threads 33 of the threaded portion 38 of the adjustment bolt 16 may be increased so that the crests of the threads may engage with a bottom inner wall 31 of the U-bracket 18 defining the receiving aperture 44. In general, the threads may be enlarged until they interfere with the opposite side of the strut hole from the tang 46 position. In other words, Thread(max)=Strut Hole−Tang Thickness (and 'error'). Additionally, by increasing the diameter of the threaded portion 38, a root diameter of the threads 33 (that is, the diameter or height as measured from the low point or root of each thread 33), may also be larger than a diameter or height of the neck 34. The diameter of the threads may be equal to the diameter of the neck.

With reference to FIG. 12, in some instances the top edge or crest of each of the threads 33 may be sized to substantially touch or engage the inner wall 31 defining the receiving aperture 44 within the U-bracket 18 of the strut 12. Since clamp load is directly related to torque divided by thread diameter, the gain in clamp force comes from the higher torque that a thicker (for instance, meaning larger diameter) thread can manage prior to failing.

With continued reference to FIG. 12, as a specific example, the receiving aperture may be approximately 16.5 mm and the adjustment apertures 50 may be approximately 14.5 mm (although other diameter sizes are envisioned as well). Continuing with this example, the major diameter of the threads 33 or H1 may be approximately 13 mm, a root diameter of the threads may be approximately 11.1 mm, the height H2 of the lobe 36 may be approximately 14 mm, and a diameter or height H3 of the neck 34 may be approximately 10.8 mm. With these values, the clamp load of the adjustment bolt 16 may be increased by approximately 17.4% compared to an adjustment bolt where the thread diameter has not been increased as shown in FIG. 12. It should be noted that the amount of gain or percentage increase in clamp load may depend not only the values/heights of the adjustment bolt 16 but also on a ratio of the receiving aperture 44 to adjustment aperture 50 ratio. Additionally, in some instances, the gain will increase more with larger thread sizes (e.g., increased height H1) as recommended maximum torque for a fastener typically increases non-linearly with thread diameter. The resulting clamp load generally increases linearly with thread size. Specifically, in some instances, torque for the adjustment bolt 16 may be related to the thread diameter by equation 1 (Eq. 1) below:

$$\text{Torque}=0.0672D^3-0.5879D^2-18.381 \qquad \text{Eq. 1}$$

As shown in Eq. 1, torque of the adjustment bolt 16 may increase in a non-linear fashion with an increase in the height H1 of the threaded portion 38. Thus, in instances of larger thread sizes, for the adjustment bolt 16 shown in FIG. 12, there may be a larger increase in clamping load than in the specific example discussed above.

In some instances, the adjustment ranges may be approximately the same as the adjustment bolt shown in FIGS. 10A and 10B. In other words, although the major diameter of the threads 33 may increase, the adjustment distance between fully negative and fully positive camber may be the same.

Figure 13:
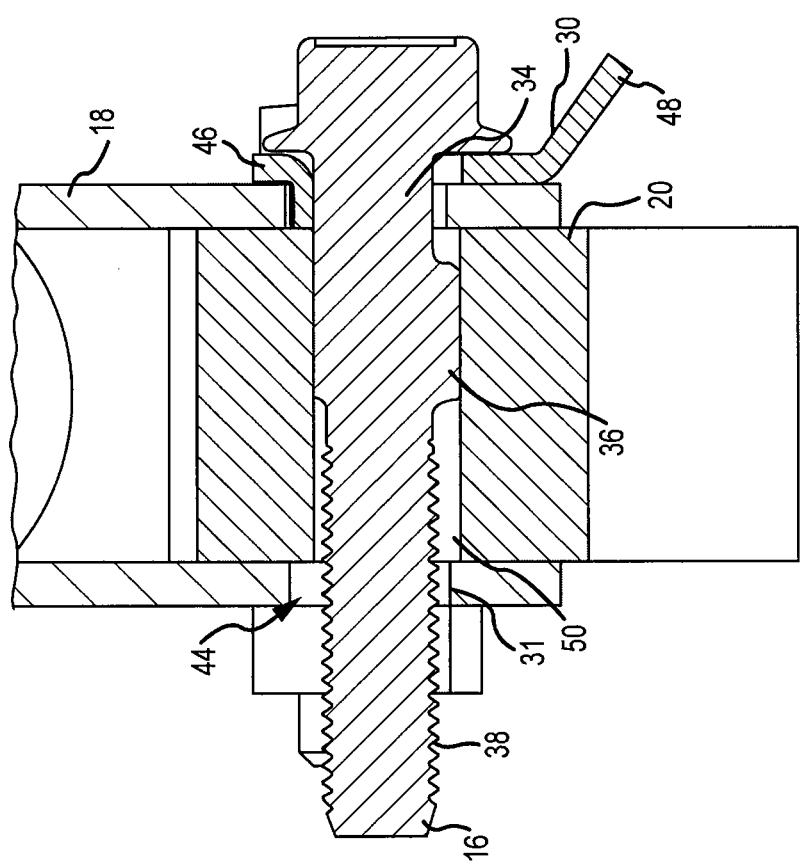
FIG. 13 is a cross-section view of the suspension strut connected to the knuckle via the adjustment assembly illustrated in FIG. 9, and with the adjustment bolt having an increased lobe diameter, viewed along line 10A-10A in FIG. 9.

In yet other embodiments, the adjustment bolt 16 may be configured to maximize the adjustment range so as to have a greater degree of camber adjustment. FIG. 13 is a cross-sectional view of the adjustment assembly viewed along line 10A-10A in FIG. 9. In this example, the height H2 of the lobe 36 may be increased to be approximately the same as the height or diameter of the adjustment aperture 50 defined within the knuckle 20. Specifically, as shown in FIG. 13, the lobe 36 diameter or height H2 may be approximately the same as the diameter $D_A$ of the adjustment aperture 50. This may allow the lobe 36, as it is rotated within the adjustment aperture 50, to more directly cause the knuckle 20 to adjust in position. In other words, because the height H2 of the lobe 36 may be approximately the same as the diameter $D_A$ of the adjustment aperture 50, substantially every degree of rotation or movement of the lobe 36 may cause the knuckle to move, as the lobe 36 may not have space to rotate within the adjustment aperture 50 without engaging and moving the knuckle 20. There is generally some clearance, but the clearance may be minimized in order to allow the greatest possible benefit for the change. As an example, acceptable clearances have been found to be 0.010-0.015 inches.

Typical bolts for adjusting camber in vehicles do not have a cam or lobe diameter that is approximately the same as the adjustment aperture because the threads of a bolt would be "over-flush" to the lobe. However, with reference to FIG. 4A, 5A, and 7, the different center lines C2 and C3 of the threaded portion 38 and the lobe 36, as well as the varying heights H1 and H2, the height of the lobe 36 can be varied without causing the major diameter of the threads 33 from extending past the plane A, and thus may not be "over flush" with the lobe 36.

With reference to FIGS. 9 and 13, the lower fastener 28 may function as a pivot point for the knuckle 20 as it rotates due to the adjustment bolt 16, and specifically as the lobe 36 rotates within the adjustment aperture 50. In some instances, the lower fastener 28 may be spaced from the adjustment bolt 16 on the U-bracket 18 by a spacing distance $S_D$ (see FIG. 9).

The spacing distance $S_D$ may effect the range of camber adjustment for the adjustment assembly 26—as $S_D$ reduces, the achievable camber range increases In a specific example, the receiving aperture 44 within the U-bracket 18 may be approximately 16.5 mm, the adjustment aperture 50 or knuckle hole may be approximately 14.5 mm, the height H2 of the lobe 36 may be approximately 14.5 mm, and the spacing distance $S_D$ between the adjustment bolt 16 and the fastener 28 may be approximately 75 mm. In this example, by increasing the height H2 of the lobe 36, the adjustment assembly 26 may increase the range of adjustment over conventional camber bolts by approximately 26.1%. However, this the gain percentage for camber range may vary with the spacing distance $S_D$. That is, if all other values stay approximately the same, for smaller values of the spacing distance $S_D$ the gain in adjustment range percentage increase may increase. This is because the closer the fastener 28 and thus pivot point of the knuckle 20 is to the adjustment bolt 20, the greater the range of motion the knuckle 20 may have around the pivot point. Additionally, continuing the example, the adjustment range may be +/−1 to 2.5 degrees, and specifically +/−1.844 degrees. This represents an increase in adjustment range of approximately 0.382 degrees (in this example) over the equivalent 2-axis bolt in the comparison. One example of the value of Sd, for instance, is 75 mm. Other spacing values being larger or smaller are contemplated. That is, the camber change that may be implemented by the adjustment bolt 16 may be increased to include 1.844 degrees of additional range of movement in either the positive or negative orientation.

Figure 14:
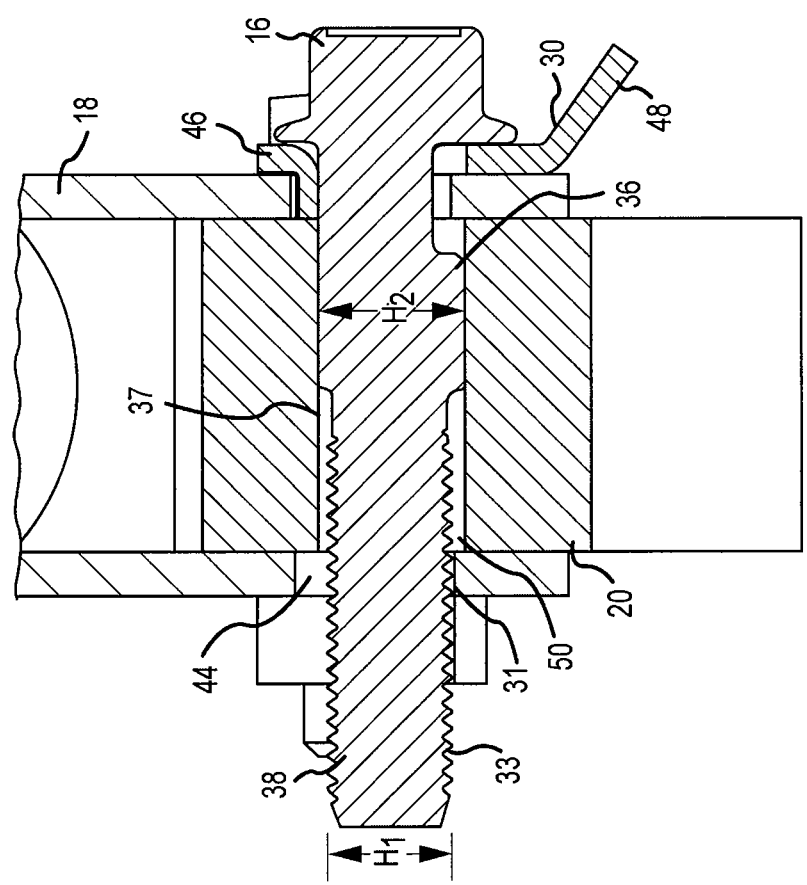
FIG. 14 is a cross-section view of the suspension strut connected to the knuckle via the adjustment assembly illustrated in FIG. 9, and with the adjustment bolt having an increased thread root diameter and increased lobe diameter, viewed along line 10A-10A in FIG. 9.

In some instances, the adjustment bolt 16 of FIG. 12 may be combined with the adjustment bolt 16 of FIG. 13. FIG. 14 is a cross-sectional view of the adjustment assembly viewed along line 10A-10A in FIG. 9 including another example of the adjustment bolt. In FIG. 14, the adjustment bolt 16 may include a lobe height H2 or diameter that may be substantially the same as the adjustment aperture 50 and the major diameter of the threads 33 may be selected so that at least one portion of the threads 33 engages a portion of the inner wall 31 of the U-bracket 18. In the embodiment illustrated in FIG. 14, the clamp load may be optimized based on an optimized adjustment range. and the lobe 36 height H2 is increased to better effect motion of the knuckle 20, providing an increased adjustment range and an increased clamp load. This is different than the embodiment in FIG. 13, where there is a gap between the crest of the threads 33 and the bottom inner wall 31 of the receiving aperture 44. Accordingly, as compared to the adjustments bolt 16 of FIG. 13, the adjustment bolt 16 illustrated in FIG. 14 will have an increased clamp load for the assembly 29.

In a specific example, with reference to FIG. 14, the receiving aperture 44 may be approximately 16.5 mm, the adjustment aperture 50 may have a diameter of approximately 14.5 mm, the lobe 36 may have a diameter of height H2 or approximately 14.5 mm, the neck 36 may have a diameter or height H3 of approximately 10.8 mm, and the threads 33 may have a root diameter of approximately 11.1 mm. In this example, the clamp load may be increased over conventional bolts by approximately 17.4% and the camber adjustment range may be increased by approximately 26.1%.

Figure 15:
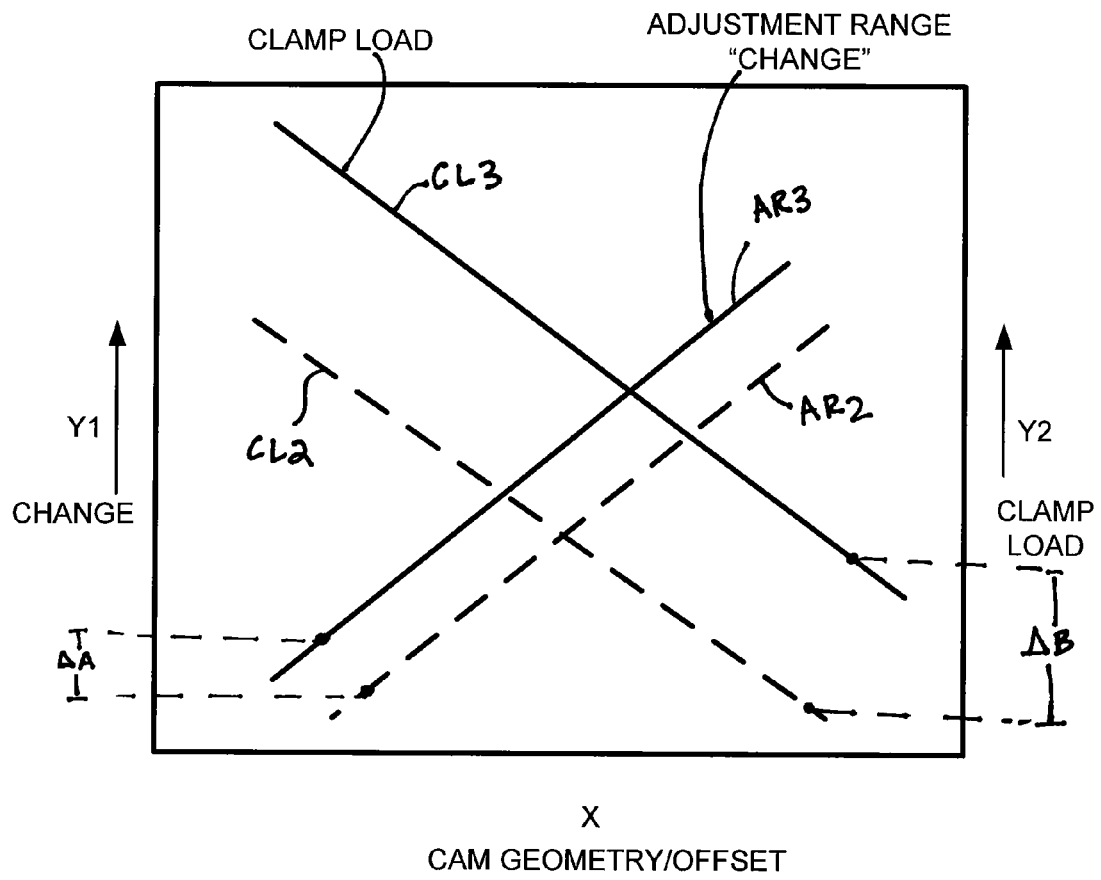
FIG. 15 is a simplified graph illustrating changes in the geometry and/or offset of the adjustment bolt relative to adjustment range changes and clamp load.

The increase in clamp load and the increase in adjustment range as shown in FIG. 14 may be increased in the adjustment bolt 16 over 2-axis conventional camber adjusting bolts. FIG. 15 is a graph illustrating adjustment range of the improvement of the adjustment bolt and clamp load values based on an assembly geometry or offset. The assembly geometry or offset may be varied by varying the offset between the neck centerline C1 compared to the lobe centerline C3, a thickness of the tang 48 of the adjustment washer 30, and/or variations in the diameters between the adjustment aperture 50 and the receiving aperture 44. Where the strut/knuckle hole sizing differs, further optimization of the tang thickness may be done to gain additional change (if the ratio becomes bigger than used in the example herein).

With reference to FIG. 15, the x-ordinate represents the Cam Geometry/Offset (i.e. the tang 46 thickness). The Y-axis Y1 on the left side of the graph represents the change in change in adjustment range, and the Y-axis Y2 on the right side of the graph represents the change in clamp load. The lines CL2 and AR2 may represent the values for a conventional bolt having two centerlines or axes for adjusting clamp load and adjustment range, respectively. The lines CL3 and AR3 may represent the values for an adjustment bolt having three uncommon centerlines or axes, such as those described herein. As can be seen in FIG. 15, the adjustment bolt having three axes provides increased values of both adjustment range and clamp load, as compared with conventional bolts. In some embodiments, the adjustment bolt 16 may have an increased gain of approximately 20% to 30% as compared with conventional camber adjusting bolts.

Referring still to FIG. 15, the comparison of CL3 and CL2 were made with the thread and lobe diameters being equivalent between the two axes bolt and three axes bolts. Delta A represents the difference between the clamping load for the two bolts at points along the two lines. Delta B represents the difference between the clamp load for the two bolts at points along the two lines. In one example, the comparison lines CL2 and CL3, as well as AR2 and AR3 are parallel over the range of tang thicknesses.

The additional change Delta A equals the distance between the first and third axes when the tang and lobe sizes are equal between the two axes bolt and the three axes bolt. This Delta A value converts to degrees when implemented in the strut adjustment system 26. The additional claim load Delta B is the difference between the tang and lobe thicknesses. For the three axis bolt the thread minor diameter can equal the neck size and for the two axes bolt the major diameter of the thread must equal the neck diameter.

Additionally, the thickness of the adjustment washer 30 may also drive the height H1 of the threaded portion 38 that may be required for the adjustment bolt 16 to fit through the receiving apertures 44 within the U-bracket 18. In these instances, because the height H1 of the neck 34 can be increased for the same size apertures 44, 50, the strength of the neck 34 may be increased for the same size assemblies. It should be noted that in some instances, the receiving aperture 44 within the U-bracket 18 may be relatively round, and the tang 46 may be relatively rectangular or non-rounded. In these instances, the effective thickness of the tang 46 may include some additional dimensions to account for the rectangular or square shape of the tang 46 interacting with the rounded shape of the receiving aperture 44.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. An adjustment fastener for adjusting camber angle in a vehicle comprising:
    a head including at least one gripping surface;
    a neck extending eccentrically from a bottom surface of the head, and having a neck diameter and a first centerline;
    a lobe extending eccentrically outward from the neck, and having a lobe diameter and a second centerline; and
    a threaded portion extending eccentrically outward from the lobe and having a thread diameter and a third centerline; wherein
    the first centerline, the second centerline, and the third centerline are different from one another; and
    the lobe diameter is substantially the same as an aperture diameter for an adjustment aperture in a knuckle operably connected to the vehicle.

2. The adjustment fastener of claim 1, wherein the threaded portion includes a plurality of threads around a perimeter of the threaded portion and the thread diameter corresponds to a major diameter of the plurality of threads.

3. The adjustment fastener of claim 1, wherein a root diameter of the threaded portion is equal to or larger than the neck diameter.

4. The adjustment fastener of claim 3, wherein the root diameter ranges between 9 to 11 mm and the lobe diameter ranges between 13.8 to 14.5 mm.

5. The adjustment feature of claim 1, wherein the lobe diameter is 1 to 3 percent smaller than the knuckle aperture diameter.

6. An adjustment assembly for adjusting a camber angle of a wheel for an automobile comprising:
    an adjustment washer including a tang extending from the body of the washer, wherein the tang is configured to be inserted into a receiving aperture on a flange of a vehicle suspension system; and
    an adjustment bolt including
        a head having a bottom surface;
        a neck extending eccentrically from the bottom surface of the head, and having a neck diameter and a first centerline;
        a lobe extending outward from the neck and being axially misaligned therewith, and having a lobe diameter and defining a second centerline; and
        a threaded portion extending outward from the lobe and being axially misaligned therewith, the threaded portion including a plurality of threads having a major thread diameter, a root diameter, and defining a third centerline; wherein
        the first centerline, the second centerline, and the third centerline are different from one another.

7. The adjustment assembly of claim 6, wherein the lobe diameter is substantially the same as an aperture diameter for an adjustment aperture in a knuckle operably connected to the vehicle.

8. The adjustment assembly of claim 7, wherein the lobe outer diameter is 1 to 3 percent smaller than the aperture inner diameter, and the major diameter of the threads is flush or less than flush with the radius of the lobe.

9. The adjustment assembly of claim 8, wherein a root diameter of the plurality of threads of the threaded portion is approximately the same as the neck diameter.

10. The adjustment assembly of claim 9, wherein the root diameter ranges between 9 to 11 mm and the lobe diameter ranges between 13.8 to 14.5 mm.

11. The adjustment assembly of claim 6, wherein the tang extends perpendicularly from the body of the washer.

12. The adjustment assembly of claim 6, wherein the major diameter of the plurality of threads is configured to contact an edge of a receiving aperture defined in a strut.

13. The adjustment assembly of claim 12, wherein the receiving aperture defined in the strut is larger than an adjustment aperture defined in a knuckle operably connected to the strut by the adjustment assembly.

14. The adjustment assembly of claim 6, wherein the lobe of the adjustment bolt is configured to position the adjustment bolt at a select orientation within a receiving aperture on a knuckle for a vehicle.

* * * * *

UNITED STATES PATENT AND TRADEMARK OFFICE
CERTIFICATE OF CORRECTION

PATENT NO. : 8,544,861 B2 Page 1 of 1
APPLICATION NO. : 13/452803
DATED : October 1, 2013
INVENTOR(S) : James Roger Frens It is certified that error appears in the above-identified patent and that said Letters Patent is hereby corrected as shown below:

In the Specifications

Column 1, Line 9: replace "2012" with "2011"

Signed and Sealed this
Fifteenth Day of April, 2014

Michelle K. Lee
*Deputy Director of the United States Patent and Trademark Office*